(12) United States Patent
Bauer et al.

(10) Patent No.: US 10,710,348 B2
(45) Date of Patent: Jul. 14, 2020

(54) METHODS AND APPARATUS TO INCREASE FIRE RESISTANCE AND FRACTURE TOUGHNESS OF A COMPOSITE STRUCTURE

(71) Applicant: The Boeing Company, Chicago, IL (US)

(72) Inventors: Andrew L. Bauer, Kirkland, WA (US); Mark E. Rogalski, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 15/660,376

(22) Filed: Jul. 26, 2017

(65) Prior Publication Data

US 2019/0030872 A1 Jan. 31, 2019

(51) Int. Cl.
*B32B 27/18* (2006.01)
*B32B 5/26* (2006.01)
(Continued)

(52) U.S. Cl.
CPC ............ *B32B 27/18* (2013.01); *B32B 5/12* (2013.01); *B32B 5/26* (2013.01); *B32B 37/14* (2013.01);
(Continued)

(58) Field of Classification Search
CPC ......... B32B 27/00; B32B 27/06; B32B 27/08; B32B 27/18; B32B 5/00; B32B 5/02; B32B 5/022; B32B 5/12; B32B 5/22; B32B 5/24; B32B 5/26; B32B 5/28; B32B 7/00; B32B 7/02; B32B 7/027; B32B 7/03; B32B 7/035; B32B 2605/00; B32B 2605/18; B32B 27/28; B32B 27/285; B32B 2371/00;
(Continued)

(56) References Cited

U.S. PATENT DOCUMENTS 4,539,253 A 9/1985 Hirschbuehler et al.
4,604,319 A 8/1986 Evans et al.
(Continued)

FOREIGN PATENT DOCUMENTS

CN 104553177 4/2015
EP 2033754 3/2009
(Continued)

OTHER PUBLICATIONS

Tomsic, Joan L.. (2000). Dictionary of Materials and Testing (2nd Edition)—airframe(s). SAE International. Retrieved from app.knovel.com/hotlink/pdf/id:kt00860801/dictionary-materials/airframe-s (Year: 2000).*
(Continued)

*Primary Examiner* — Maria V Ewald
*Assistant Examiner* — Ethan A. Utt
(74) *Attorney, Agent, or Firm* — Hanley, Flight & Zimmerman, LLC

(57) ABSTRACT

Methods and apparatus to increase fire resistance and fracture toughness of a composite structure are described. An example apparatus includes a composite structure formed by an innermost ply and a fire-resistant ply including a first additive to increase a flammability resistance of the structure, where the fire-resistant ply is an inner ply of the composite structure.

20 Claims, 7 Drawing Sheets

(51) Int. Cl.
*B64C 1/00* (2006.01)
*B32B 5/12* (2006.01)
*B32B 37/14* (2006.01)

(52) U.S. Cl.
CPC ... *B32B 2260/021* (2013.01); *B32B 2260/023* (2013.01); *B32B 2260/046* (2013.01); *B32B 2262/106* (2013.01); *B32B 2307/3065* (2013.01); *B32B 2307/558* (2013.01); *B32B 2605/18* (2013.01); *B64C 2001/0072* (2013.01)

(58) Field of Classification Search
CPC ......... B32B 27/12; B32B 27/14; B32B 27/38; B32B 2363/00; B32B 27/02; B32B 27/04; B32B 5/30; Y10T 428/24058; Y10T 428/24074; Y10T 428/24091; Y10T 428/24099; Y10T 428/24116; Y10T 428/24124; Y10T 428/24132; Y10T 428/24942; Y10T 428/2495; Y10T 428/24967; Y10T 428/24975; Y10T 428/26; Y10T 428/263; Y10T 428/264; Y10T 428/265; Y10T 428/266; Y10T 428/268; Y10T 428/269; Y10T 428/27; Y10T 428/273; Y10T 428/31511; Y10T 428/31515; Y10T 428/31518; Y10T 428/31522; Y10T 428/31525; Y10T 428/31529; Y10T 428/24959; Y10T 428/25; Y10T 428/251; Y10T 428/252; Y10T 428/253; Y10T 428/254; Y10T 428/256; Y10T 428/257; Y10T 428/258; Y10T 428/259; Y10T 442/20; Y10T 442/2008; Y10T 442/2369; Y10T 442/2631; Y10T 442/2648; Y10T 442/2656; Y10T 442/2664; Y10T 442/2672; Y10T 442/268; Y10T 442/2689; Y10T 442/2697; Y10T 442/2705; Y10T 442/2713; Y10T 442/2721; Y10T 442/2861; Y10T 442/2869; Y10T 442/2877; Y10T 442/2885; Y10T 442/2893; Y10T 442/2902; Y10T 442/291; Y10T 442/2918; Y10T 442/2926; Y10T 442/2934; Y10T 442/2943; Y10T 442/2951; Y10T 442/2959; Y10T 442/2967; Y10T 442/2975; Y10T 442/2984; Y10T 442/2992; Y10T 442/30; Y10T 442/3065; Y10T 442/3472; Y10T 442/3528; Y10T 442/3537; Y10T 442/3545; Y10T 442/3569; Y10T 442/3585; Y10T 442/3602; Y10T 442/365; Y10T 442/3659; Y10T 442/3707; Y10T 442/378; Y10T 442/3789; Y10T 442/3813; Y10T 442/3829; Y10T 442/3837; Y10T 442/3854; Y10T 442/3919; Y10T 442/60; Y10T 442/608; Y10T 442/614; Y10T 442/623; Y10T 442/624; Y10T 442/626; Y10T 442/643; Y10T 442/644; Y10T 442/659; Y10T 442/668; Y10T 442/669; Y10T 442/67; Y10T 442/671; Y10T 442/673; Y10T 442/674; Y10T 442/697; Y10T 442/698; Y10T 442/699; B64C 1/00; B64C 1/06; B64C 1/064; B64C 1/065; B64C 1/068; B64C 2001/0054; B64C 2001/0072; B64C 3/00; B64C 3/182; B64C 3/185; B64C 3/26; B64C 1/066; B64C 1/0683; B64C 1/0685; C08G 63/692; C08G 63/6924; C08G 63/6926; Y10S 428/92; Y10S 428/921; C08L 63/00; C08L 63/04; C08L 63/06; C08L 63/08; C08L 63/10
USPC ........ 428/105, 107, 109–114, 219, 220, 332, 428/334–341, 413–418, 212–216, 920, 428/921, 323–331; 244/177 R, 119–121, 244/123.1, 129.1, 129.2, 133; 528/287; 442/59, 60, 104, 136, 138–147, 164–180, 442/181, 189, 239, 246–248, 251, 253, 442/255, 262, 268, 269, 277, 278, 281, 442/283–286, 294, 327, 334, 340, 348, 442/349, 351, 366, 367, 381, 389–394, 442/415–417; 523/400, 427, 440, 523/442–444, 451, 452, 457, 458, 461, 523/468

See application file for complete search history.

(56) References Cited

U.S. PATENT DOCUMENTS

| | | |
|---|---|---|
| 4,957,801 A | 9/1990 | Maranci et al. |
| 5,028,478 A | 7/1991 | Odagiri et al. |
| 6,333,280 B1 | 12/2001 | Hashimoto et al. |
| 7,435,693 B2 | 10/2008 | Tsotsis et al. |
| 7,459,048 B2 | 12/2008 | Pham et al. |
| 7,735,779 B2 | 6/2010 | Griess et al. |
| 8,042,767 B2 | 10/2011 | Velicki et al. |
| 8,246,882 B2 | 8/2012 | Tsotsis |
| 8,268,926 B2 | 9/2012 | Bonneau et al. |
| 8,361,262 B2 | 1/2013 | Tsotsis et al. |
| 8,388,795 B2 | 3/2013 | Tsotsis |
| 9,855,721 B2 * | 1/2018 | Drexler ............... B64C 1/12 |
| 2004/0086729 A1 * | 5/2004 | Nguyen ............... B32B 15/092 428/458 |
| 2004/0266294 A1 * | 12/2004 | Rowen ............... D06M 11/78 442/149 |
| 2005/0257887 A1 | 11/2005 | Tsotsis |
| 2006/0093802 A1 * | 5/2006 | Tsai ............... B32B 5/26 428/216 |
| 2008/0105785 A1 * | 5/2008 | Griess ............... B64C 1/068 244/120 |
| 2009/0311535 A1 | 12/2009 | Tilbrook et al. |
| 2010/0087587 A1 | 4/2010 | Wang et al. |
| 2010/0209679 A1 | 8/2010 | Tompkins |
| 2010/0304118 A1 | 12/2010 | Baidak et al. |
| 2013/0052897 A1 | 2/2013 | Rogers et al. |
| 2014/0170408 A1 | 6/2014 | Frulloni et al. |
| 2014/0174654 A1 * | 6/2014 | Kabutoya ............... C09J 7/38 156/332 |
| 2015/0283788 A1 | 10/2015 | Tsotsis |
| 2015/0337183 A1 | 11/2015 | Pratte et al. |
| 2016/0082691 A1 * | 3/2016 | Restuccia ............... B32B 27/18 442/417 |
| 2016/0083871 A1 * | 3/2016 | Meure ............... D02G 3/36 524/1 |
| 2016/0089851 A1 | 3/2016 | Drexler et al. |

FOREIGN PATENT DOCUMENTS

| | | |
|---|---|---|
| EP | 3000593 | 3/2016 |
| WO | 2004039916 | 5/2004 |
| WO | 2013032620 | 3/2013 |
| WO | 2014120347 | 8/2014 |
| WO | 2017120171 | 7/2017 |

OTHER PUBLICATIONS

Federal Institute of Industrial Property, "Office Action of the substantive examination," issued in connection with Russian Patent Application No. 2018112449/05(019477), dated Mar. 1, 2019, 13 pages.

(56) References Cited

OTHER PUBLICATIONS

European Patent Office, "Extended European Search Report," issued in connection with European Patent Application No. 18166294.1, dated Jul. 10, 2018, 8 pages.

* cited by examiner

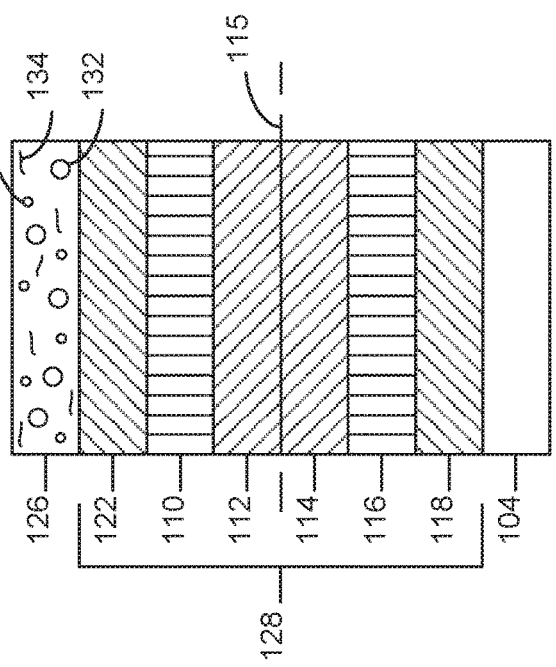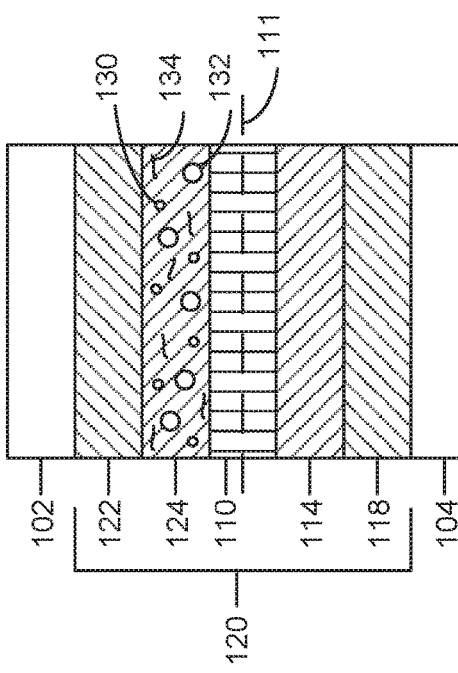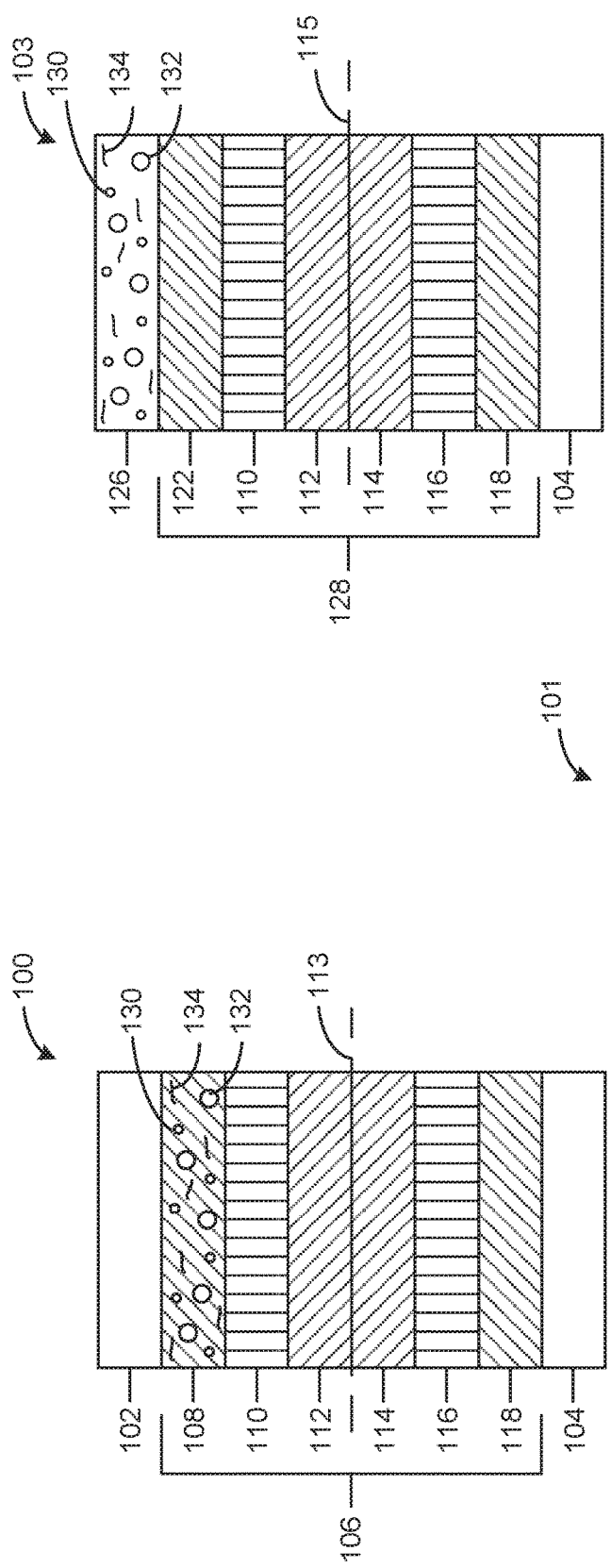

METHODS AND APPARATUS TO INCREASE FIRE RESISTANCE AND FRACTURE TOUGHNESS OF A COMPOSITE STRUCTURE

FIELD OF THE DISCLOSURE

This disclosure relates generally to composite structures and, more particularly, to methods and apparatus to increase fire resistance and maintaining fracture toughness of a composite structure without impacting manufacturing flow or weight.

BACKGROUND

Fuselages of aircraft are required to meet safety standards set by a regulatory agency (e.g., the United States Federal Aviation Administration). Typically, the fuselage structures, and the corresponding minimum skin gage, of aircraft are sized by mechanical loading and/or damage tolerance based on regulations and safety criteria. (e.g., Boeing 787 and Airbus A350). Minimum skin gages on larger aircraft to date have sufficient thermal thickness and are sufficiently fire resistant to prevent flame propagation.

SUMMARY

An example apparatus includes a composite structure formed by an innermost ply and a fire-resistant ply including a first additive to increase a flammability resistance of the structure, where the fire-resistant ply is an inner ply of the composite structure.

Another example apparatus includes a base composite for forming a ply of multi-ply structure of an aircraft, a first additive to reduce a flammability of the ply and the multi-ply structure, and a second additive to increase a fracture toughness of the multi-ply structure.

An example method includes laying a first composite ply, laying a second composite ply, the second ply including a fire-resistant additive, laying a third composite ply, and curing the plies to from a composite structure, the composite structure having fire-resistant properties.

BRIEF DESCRIPTION OF THE DRAWINGS

FIGS. 1A-1C are cross-sectional views of example multi-ply composite structures described herein.

Figure 2:
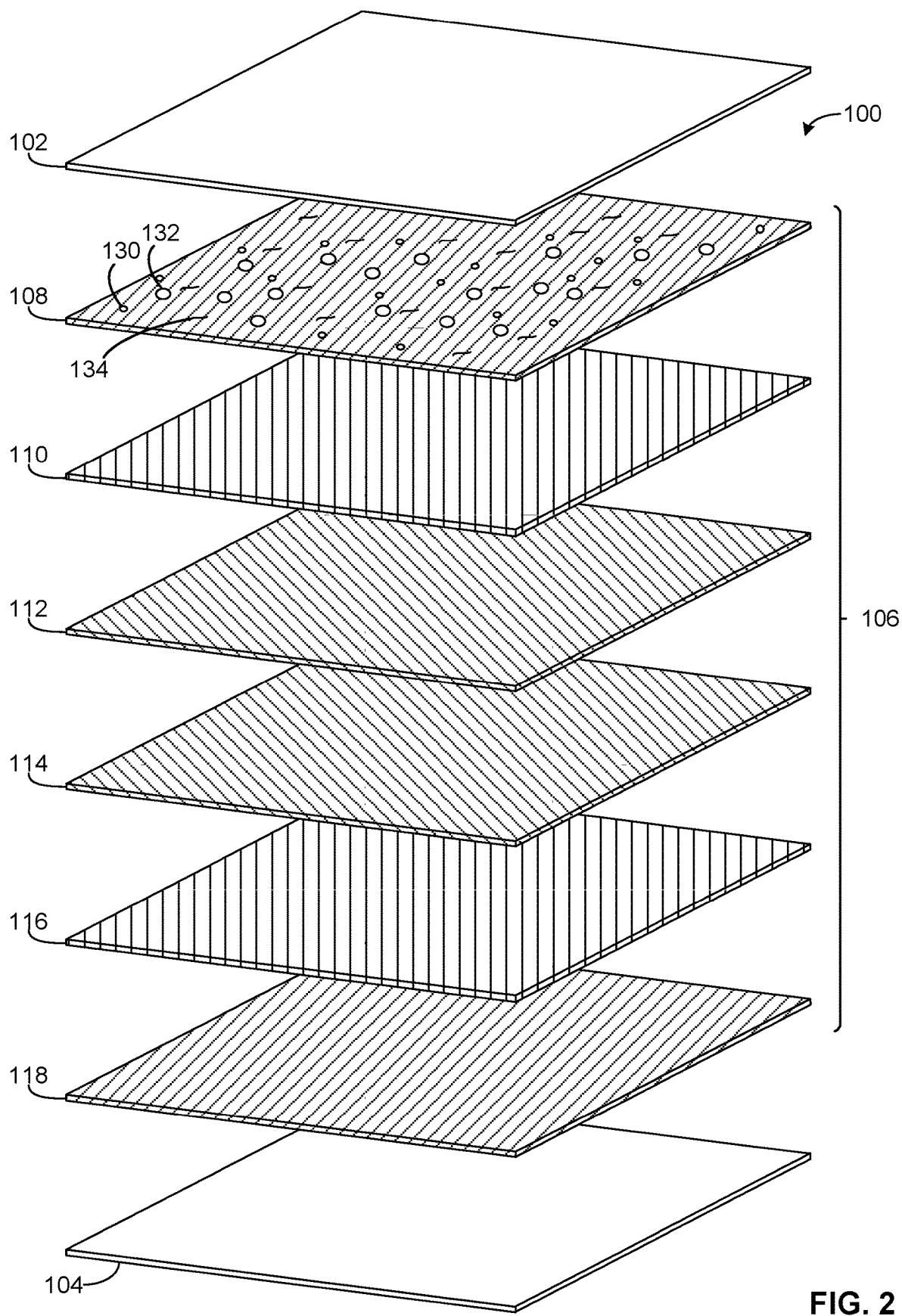
FIG. 2 is an exploded view of an example multi-ply composite structure of FIG. 1A.

The figures are not to scale. Instead, to clarify multiple layers and regions, the thickness of the layers may be enlarged in the drawings. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

The example composite structures described herein are multi-ply composite structures that include fire-resistant materials added to at least one ply. As used herein, the term fire-resistant may be used to refer to materials that are fire-resistant and/or fire retardant. The example fire-resistant materials may be added to a ply that is required for structural reasons rather than adding the fire-resistant materials to an additional, nonstructural ply. Thus, the example composite structures can be manufactured more quickly and at a reduced cost compared to composite structures with added fire-resistant coatings or individually added, nonstructural plies. The example composite structure described herein may be used for a variety of applications, including aircraft, watercraft, spacecraft, automobiles, land vehicles, turbines, sporting equipment, military equipment, medical equipment, consumer goods, etc. The example composite structures with integrated fire-resistant materials described herein meet the fire resistance standards and the fracture toughness standards of multiple industries.

An example composite structure includes at least a first ply and a second ply. In some examples, the first ply may have a different thickness and/or may be made of a different material than the second ply. For example, the first ply may be a fabric type composite material having a thickness between 7.5 microinches and 9 microinches, and the second ply may be a tape type composite material having a thickness between 5 microinches and 8 microinches. Alternatively, the first and second plies may be substantially the same thickness and may be made of the same type of composite. One of the plies may include additives (e.g., inorganic-organic hybrid materials) to increase flammability resistance of the composite structure. In some examples, the second ply includes the additives. In some examples, the first ply is oriented at a first angle and the second ply is oriented at a second angle (i.e., composite fibers of the first ply are oriented in a different direction relative to the fibers of the second ply).

In some examples, the composite structure includes one or more additional plies, which may be fabric type composite plies, tape type composite plies, prepreg plies, electromagnetic effect (EME) plies, or any other type of composite ply. In some examples, the top and bottom surfaces (e.g., interior and exterior surfaces, the first ply and a last ply) of the composite structure are formed by the fabric type composite plies. Additionally, the first and last plies of the composite structure may not include additives, which are included in an inner ply (e.g., the second ply). In some examples, the composite structure includes one or more additional inner plies that do not include additives (e.g., additives to increase flammability resistance that may be added to the second ply). In such examples, the ply including additives (e.g., the second ply) has a flammability resistance greater than a flammability resistance of the other plies of the composite structure. The increased flammability resistance of a single ply, for example, the second ply, of a composite structure increases the flammability resistance of the structure as a whole.

In some examples, one or more plies of the composite structure include second additives to increase a fracture toughness or strength of the composite structure. In some examples, the second additives are added to the same ply as the additives that increase flammability resistance. Some example second additives include thermoplastics that char upon contact with a flame to form a protective layer against flame propagation.

An example ply may include a base composite (e.g., a composite resin, fibers, etc.) used to form the ply. In some examples, the base composite may be approximately 30%-45% resin by mass. A volume fraction of fibers (e.g., carbon fibers) of the composite may be between 45% and 65%. Multiple plies may be formed by the base composite. In some examples, the same base composite may be used to form different types of composite plies (e.g., tape type plies, fabric type plies, prepreg plies, EME plies, etc.). A first additive (e.g., inorganic-organic hybrid fire retardant) may be added to a portion of the base composite (e.g., a portion of the composite resin that may be used to form one ply of the multi-ply composite structure). The first additive may be operative to reduce a flammability of the ply near a surface exposed to a fire source and, therefore, the composite structure.

In some examples, a second additive (e.g., a charring thermoplastic) may also be added to the portion of the base composite. The second additive may be operative to increase a fracture toughness of the multi-ply composite structure and may be in the form of nanotube, a nanoparticle, a film, a veil, a mesh, toughening particles, or a filamentous material. Additionally or alternatively, the second additive may further improve flammability resistance if, for example, the second additive is a veil or a certain particle (e.g., a PEEK particle). That is, in some examples, a second ply of the composite structure may include the first additives and an additional ply (e.g., a third ply, a fourth ply) of the composite structure may include the second additive. Further, in some examples, a third additive (e.g., kaolin clay, melamine, etc.) may be added with the second additive to promote char in the second additive when the second additive is a charring thermoplastic.

The example plies may be formed into the composite structure (e.g., a composite fuselage of an aircraft) by laying a first ply (e.g., an innermost ply), laying a second ply including a fire-resistant additive (e.g., an inorganic-organic hybrid material), and laying a third ply (e.g., an outermost ply). In some examples, the plies may be a fabric type composite, a tape type composite, a prepreg composite, and/or any combination thereof. Additionally, some example composite structures may include additional inner plies disposed between the first ply and the third ply. In some examples, each of the additional inner plies may be positioned on either side of the second ply, which includes additives. That is, the ply including additives may not necessarily be the second ply of the composite structure. Typically, the ply of the multi-ply composite structures that includes the fire resistance increasing additives is positioned closer to a first surface (e.g., an interior surface) of the composite structure than the second surface (e.g., an exterior surface) of the composite structure. Thus, the example composite structure protects against flame propagation on an interior of the composite structure. The additional inner plies may not include additives. Alternatively, one or more of the additional plies may include different additives (e.g., a toughness increasing additive, a char inducing additive) than in the second ply, which includes fire resistance increasing additives. After laying all the plies of the multi-ply structure, the plies are cured (e.g., using a co-cure and/or co-bond process) to form a single composite structure (e.g., a fuselage of an aircraft) having fire-resistant properties.

Fuselages of aircraft are required to meet safety standards set by a regulatory agency (e.g., the United States Federal Aviation Administration). Typically, the fuselage structures, and the corresponding minimum skin gage, of aircraft (e.g., Boeing 787 and Airbus A350) are sized by mechanical loading. Minimum skin gages on current larger aircraft are thermally thick and sufficiently fire resistant to prevent flame propagation. Smaller passenger aircraft, with reduced mechanical load demands on the fuselage structure, may be sized (e.g., a size or thickness of the fuselage is determined) by mechanical loading and/or damage tolerance based on regulations and safety criteria and may have fuselages with minimum gages that are not thermally thick and do not satisfy the flammability safety standards without the addition of specialized materials through additional process steps (coatings, films, foams, etc.). In some current examples, a fire-resistant coating is applied to the fuselage after the fuselage is assembled. The fire-resistant coating may be a spray-on coating or layer, or may be a different type of coating applied to an interior surface of the fuselage. However, applying a fire-resistant coating may increase the manufacture time and/or cost of the fuselage. In other current examples, materials may be added to the fuselage structure with additional process steps prior to cure of the fuselage structure, which can increase a weight of the structure. Thus, the example composite structures described herein are superior to these current examples because the example composite structure described herein provides sufficient fire protection while maintaining fracture toughness of the composite structure, without increasing the manufacture time or adding weight to the composite structure.

FIGS. 1A-1C depict cross-sectional views of example composite structures 100, 101, 103 described herein. In the illustrated examples of FIGS. 1A-1C, the composite structures 100, 101, 103 include multiple plies or layers. The example composite structures 100, 101, 103 include a layer that is fire-resistant. That is, a layer that is rated as more fire-resistant than the other layers in the composite structures 100, 101, 103. For example, a second layer of the composite structure 100, 101, 103 may have a higher flammability resistance than the remaining layers in the composite structures 100, 101, 103. Including a single layer that has a greater fire resistance increases the overall fire resistance of the composite structures 100, 101, 103. Alternatively, the fire-resistant layer may be in a different position within the composite structures 100, 101, 103, but is typically within the innermost 50% of the layers of the composite structures 100, 101, 103, and preferably within the innermost 33% of the layers. In some examples, the fire-resistant layer is within the innermost 3% of plies and the innermost 33% of plies to reduce a heat release value and prevent flame propagation at the inner surface. In some examples, the fire-resistant ply may be positioned within the outermost 33% of layers to protect against flame propagation from an external source or fuel tank. In some such examples, two fire-resistant plies may be included in the composite structure 100, 101, 103, where a first fire-resistant ply is within the innermost 33% of layers and a second fire-resistant ply is within the outermost 33% of layers. Additionally, the fire-resistant layer can increase an ignition temperature required to start flame propagation, thus further preventing flame propagation and reducing flammability of the composite structure 100, 101, 103. Typically, a composite structure 100, 101, 103 that is isometrically symmetrical (e.g., symmetrical about a center point of the layer stack) is preferred. In some examples, objects (e.g., stringers 412, other frame elements) added to the composite structures 100, 101, 103 at certain points on the composite structure 100, 101, 103 may prevent the composite structure 100, 101, 103 from being isometrically symmetrical at those points In some examples, only a single ply of the composite structure 100, 101, 103 is fire-resistant. In some examples, in composites structures having 7 plies or less, the composite structure includes at least one fire-resistant ply, and up to 80% of the layers in the composite structure may be fire-resistant plies. In some such examples, the fire-resistant layer(s) may be positioned within the innermost 50% of plies to provide protection against flames from the innermost side of the composite structure, and may be positioned within the outermost 50% of plies to provide protection against flames from the outer side of the composite structure. In some examples, fire-resistant plies may be positioned within both the innermost 43% of plies and the outermost 43% of plies to provide fire protection on both sides of the composite structure. In some examples including multiple fire-resistant plies, the fire-resistant plies may be grouped together, or may be alternated with standard composite plies. In examples where more than 33% of the plies are fire-resistant plies, all of the innermost and/or outermost plies may be fire-resistant plies.

In composite structures including a larger number of plies (e.g., between 8 and 11 plies), at least one ply is a fire-resistant ply, and the example composite structure may include multiple fire-resistant plies (e.g., between 1 and 3 fire-resistant plies). In some examples, up to 50% of the plies of the composite structure may be fire-resistant plies. The example fire-resistant ply or plies may be positioned within the innermost 40% of plies to provide protection against flames from the innermost side of the composite structure, and may be positioned within the outermost 40% of plies to provide protection against flames from the outer side of the composite structure. In some examples, fire-resistant plies may be positioned within both the innermost 33% of plies and the outermost 33% of plies to provide fire protection on both sides of the composite structure. In examples where 50% of the plies are fire-resistant plies, the fire-resistant plies may be positioned in the innermost 50% of plies, the outermost 50% of plies, or split between the innermost plies and the outermost plies to provide sufficient fire protection from either side of the composite structure. In examples including multiple fire-resistant plies, the fire-resistant plies may be grouped together, or may be spaced apart to include one or more standard plies between fire-resistant plies.

In some example composite structures (e.g., composite structures having more than 11 layers), and the example composite structure may include multiple fire-resistant plies (e.g., between 1 and 3 fire-resistant plies). In some examples, up to 33% of the plies of the composite structure may be fire-resistant plies. The example fire-resistant ply or plies may be positioned within the innermost 33% of plies to provide protection against flames from the innermost side of the composite structure, and may be positioned within the outermost 33% of plies to provide protection against flames from the outer side of the composite structure. In some examples, fire-resistant plies may be positioned within both the innermost 33% of plies and the outermost 33% of plies to provide fire protection on both sides of the composite structure. In examples including multiple fire-resistant plies, the fire-resistant plies may be grouped together, or may be spaced apart to include one or more standard plies between fire-resistant plies. In examples including multiple fire-resistant plies, the fire-resistant plies may be distributed throughout the composite structure in any suitable manner.

In the illustrated examples, the composite structures 100, 101, 103 include two layers 102, 104, 126 (e.g., an innermost layer 102, 126, an outermost layer 104) that form the outer surfaces of the composite structure. As shown in FIG. 1A, the fire-resistant layer may preferably be one of inner layers 106, between the two outermost layers 102, 104. For example, in the example composite structure 100 of FIG. 1A, the fire-resistant layer is the second layer 108. The example composite structure 100 also includes additional inner layers 106. In the illustrated example, the composite structure 100 includes a third layer 110, a fourth layer 112, a fifth layer 114, a sixth layer 116, and a seventh layer 118 disposed between the outer layers 102, 104 (e.g., the first layer 102 and an eighth layer 104). In the illustrated example, the composite structure 100 is symmetrical (e.g., in relation to the orientation of the layers 106) about a plane 113 between the fourth and fifth layers 112 and 114.

In the illustrated example composite structure 101 of FIG. 1B, the fire-resistant layer may be the third layer 124. The example composite structure 101 of FIG. 1B includes a different number of layers than the composite structure 100 of FIG. 1A. Other examples may include any other number of layers (e.g., fewer layers, more layers) suitable for the application of the composite structures and flammability requirements. The example composite structure 101 includes the outer layers 102, 104, similar to the example composite structure 100. However, inner layers 120 of the example composite structure 101 may be different. In the illustrated example composite structure 101, the inner layers 120 may include layers that are substantially similar to the inner layers 106 of the composite structure 100 of FIG. 1A, and like reference numbers are used. The example inner layers 120 of the composite structure 101 include a second layer 122 that is not fire resistant, a third layer 124 that is fire resistant, a fourth layer 110, a fifth layer 114, and a sixth layer 118. In the illustrated example, the composite structure 101 is symmetrical about a plane 111 in the middle of the fourth layer 110.

In the illustrated example of FIG. 1C, the example composite structure 103 is substantially similar to the composite structure 100 of FIG. 1A, except for the placement of the fire-resistant layer. In the example composite structure of FIG. 1C, the first layer 126 is the fire-resistant layer. Thus, inner layers 128 of the composite structure 103 do not include any fire-resistant layers. The second layer 122 of the composite structure 103 is substantially similar to the second layer 122 of the composite structure 101 of FIG. 1B. The third through eighth layers 110, 112, 114, 116, 118, 104 of the composite structure 103 are substantially similar to the third through eighth layers 110, 112, 114, 116, 118, 104 of the composite structure 100, and like reference numbers have been used. In the illustrated example, the composite structure 103 is symmetrical (e.g., in relation to the orientation of the layers 106) about a plane 115 between the fourth and fifth layers 112 and 114.

The example fire-resistant layers 108, 124, 126 of the respective composite structures 100, 101, 103 may have an increased flammability resistance (i.e., with respect to the other layers of the composite structures 100, 101, 103) due to fire-resistant additives (e.g., first additives) 130 being added to the layers 108, 124, 126 prior to the formation of the composite structures 100, 101, 103. In the illustrated example composite structures 100, 101, 103, adding the first additives 130 to a single layer (e.g., layer 108, layer 124) of the composite structures 100, 101, 103 is sufficient to achieve a desired flammability resistance. In other examples, additional layers may include fire-resistant additives to further increase the flammability resistance of the composite structures 100, 101, 103. In some examples, the first additives 130 may be combined with second additives 132 (e.g., a charring agent) and/or third additives 134 (a toughening agent) prior to being added to the composite structure 100, 101, 103. Alternatively, the first, second, and third additives 130, 132, 134 may be added to the composite structures 100, 101, 103 individually. In some examples, the composite structures 100, 101, 103 may be epoxy based structures (e.g., the layers of the composite structures 100, 101, 103 are an epoxy based resin) with added fibers (e.g., carbon fibers). The first, second, and/or third additives 130, 132, 134 may be added to the epoxy based composite structures 100, 101, 103 in addition to the carbon fibers.

In some examples, the first additives 130 may be inorganic-organic hybrid (IOH) fire retardant operative to increase the fire resistance of the composite structures 100, 101, 103. Alternatively, the first additive may be an inorganic component or an organic component. A preferred first additives 130 increases an ignition temperature and decreases a heat release energy. In some examples, the IOHs include an expandable or swellable layered inorganic component and an organic component including at least one ionic organic component. The IOHs may also include one or more neutral organic component that is interlaced between and/or associated with the layers(s) of the inorganic component. In some examples, a fire-resistant formulation of an IOH includes one or more flame retardants.

The example inorganic component of the IOH may include a 1:1 layered silicate structure, such as kaolin and serpentine, and a 2:1 layered silicate structure such as phyllosilicates, talc, and pyrophyllite. Other useful layered minerals may include layered double hydroxides of the general formula $Mg_gAl_{3.4}(OH)18.3(OO3)1.7H_zO$ including hydrotalcites and synthetically prepared layered materials including synthetic hectorite, montmorillonite, fluorinated synthetic mica, and synthetic hydrotalcite. The group consisting of naturally occurring or synthetic analogues of phyllosilicates is particularly preferred. This group includes smectite clays such as montmorillonite, nontronite, beidellite, volkonskoite, hectorite, bentonite, saponite, sauconite, magadiite, kenyaite, laponite, vermiculite, synthetic micromica (Somasif), and synthetic hectorite (Lucentite). Other useful layered minerals include illite minerals, such as ledikite, and mixtures of illite minerals with clay minerals. In some examples, naturally occurring phyllosilicates, such as bentonite, montmorillonite, and hectorite are preferred. Such phyllosilicates with a platelet thickness less than about 5 nanometers and aspect ratios greater than about 10:1, more preferably greater than about 50:1, and most preferably greater than about 100:1, are particularly useful.

The preferred inorganic materials generally include interlayer or exchangeable metal cations to balance the charge, such as alkali metals or alkali earth metals, for example $Na+$, $K+$, $Mg2+$, or $Ca2+$, but preferably $Na+$. The cation exchange capacity of the inorganic material should preferably be less than about 400 milli-equivalents per 100 grams, most preferably about 500 to 200 milli-equivalents per 100 grams.

The organic component includes one or more ionic species that may be exchanged with the exchangeable metal ions associated with the inorganic component and optionally one or more neutral organic species that are intercalated between and/or associated with the layer(s) of the inorganic component and/or one or more coupling reagents. Suitable examples of ionic species that include those that contain onium ions such as ammonium (primary, secondary, tertiary, quaternary), phosphonium, or sulfonium derivatives of aliphatic, aromatic or aryl-aliphatic amines, phosphines and sulfides. Such compounds may be prepared by any suitable method known in the art. For example, salts prepared by acid-base type reaction with mineral or organic acids, including hydrochloric, sulfuric, nitric, phosphoric, acetic, and formic acids, by Lewis-acid-Lewis-base type reactions or by reactions with alkyl halides to form quaternary salts, for example, using a Menschutkin type methodology. Ionic or neutral compounds that are known to decompose or sublime endothermically, and/or which release volatiles with low combustability on decomposition and/or include charring or organic species during thermal decomposition or combustion are particularly preferred.

Suitable species include neutral or ionic derivatives of nitrogen based molecules, such as triazine based species, for example, melamine, triphenyl, melam (1,3,5-triazine-2,4,6-triamine-n-(4,6-diamino-1,3,5-triazine-yl)), melam ((−2,5, 8-triamino-1,3,4,6,7,9,9b-heptaazaphenalene)), melon (poly {8-amino-1,3,4,6,7,9,9b-heptaazaphenalene-2,5-diyl} imino}), bis and triaziridinyltriazine, trimethylsilyltriazine, melamine cyanurate, melamine phthalate, melamine phosphate, melamine phosphite, melamine phthalimide, dimelamine phosphate, phosphazines, and/or low molecular weight polymers with triazine and phosphazine repeat units or salts or derivatives of the above molecules including onium ion derivatives or salts or derivatives of isocyanuric acid, such as isocyanuric acid, cyanuric acid, triethyl cyanurate, melamine cyanurate, trigylcidylcyanurate, triallyl isocyanurate, trichloroisocyanuric acid 1,3,5-tris (2-hydroxyethyl) triazine-2,4,6-trione, hexamethylenentetramine, melam cyanurate, melem cyanurate, and melon cyanurate.

As shown in FIGS. 1A-1C, the layers 108, 124, 126 including the first additives 130 may also include the second additive or additives 132 and the third additive or additives 134. The second additives 132 includes agents to promote char in thermoplastics and/or the first additives 130, such as kaolin clay or melamine. Other materials operative to promote char may be used as well. Reagents known to promote charring in organic species include derivatives of phosphoric acid or boric acid, such as ammonia polyphosphate and melamine polyphosphate, and melamine phosphate ammonium borate. In some examples, the preferred ionic compounds may optionally be used in combination with other ionic compounds, for example, those known to improve compatibility and dispersion between the layered inorganic material and polymeric matrices. Amphiphilic molecules that incorporate a hydrophilic ionic group along with hydrophobic alkyl or aromatic moieties are preferred. One or more coupling reagents may also be associated with the inorganic component. Suitable coupling reagents include organically functionalized silanes, zicronates, and titanates. Examples of silane coupling reagents include tri-alkoxy, acetoxy, and halosilanes functionalized with amino, epoxy, isocyanate, hydroxyl, thiol, mercapto, and/or methacryl reactive moieties or modified to incorporate functional groups based on triazine derivatives, long chain alkyl, aromatic or alkylaromatic moieties. Examples of zicronate and titanate coupling reagents include Teaz and Titanl. It is known in the art that metal cations or anions associated with layered inorganic materials may be exchanged with organic ions through an ion exchange process. In a typical process, the layered inorganic material is first swollen or expanded in a suitable solvent or solvents prior to ion exchange and then collected from the swelling solvent following agglomeration using methods such as filtration, centrifugation, evaporation, or sublimation of the solvent. Ion exchange techniques with suitable molecules are known to be a useful method of increasing the compatibility between clay and organic polymeric binders, thus aiding dispersion of clay platelets into polymeric based matrices on a nanometer scale.

Suitable flame retardants that retard flame propagation, heat release, and/or smoke generation, which may be added singularly or synergistically to the IOH include phosphorous derivatives such as molecules containing phosphate, polyphosphate, phosphites, phosphazine and phosphine functional groups, for example, melamine phosphate, dimelamine phosphate, melamine polyphosphate, ammonia phosphate, ammonia polyphosphate, pentaerythritol phosphate, melamine phosphite and triphenyl phosphine. Nitrogen containing derivatives such as melamine, melamine cyanurate, melamine phthalate, melamine phthalimide, melam, melem, melon, melam cyanurate, melemcyanurate, melon cyanurate, hexamethylene tetraamine, imidazole, adenine, guanine, cytosine, and thymine may be used as first additive(s) 130. Molecules containing borate functional groups, such as ammonia borate and zinc borate may also be used as first additive(s) 130. Molecules containing two or more alcohol groups such as pentaerythritol, polyethylene alcohol, polyglycols and carbohydrates, for example, glucose, sucrose, and starch may be used as first additives 130. Molecules which endothermically release non-combustible decomposition gases, such as metal hydroxides, for example, magnesium hydroxide and aluminum hydroxide are useful. Expandable graphite may also be used. The polyamide based matrix may be included in the fire-resistant formulation in pellet, granule, flake, or powdered form. Suitable polyamides comprise generic groups with repeat units, based on amides, such as Nylon4, Nylon6, Nylon7, Nylon11, and Nylon12, Nylon 46, Nylon66, Nylon68, Nylon610, Nylon612, and aromatic polyamides, for example, poly'm'phenyleneisaphthalamine and poly'p'phenylene'terephthalmamide. In some examples, the polyamide matrix may include co-polymers, blends, and alloys. The co-polymers may be made up of two or more different repeat units, one of which is an amide. Such co-polymers may be prepared by any suitable methods known in the art, for example, at the point of initial polymerization or later through grafting or chain extension type reactions during processing. The polyamide blends and alloys may be prepared using any method known to those skilled in the art including melt or solution blending. In some examples, the polyamide blends may also increase and/or maintain a fracture toughness and/or may be operative for use as toughening agents (e.g., third additives). Blending or alloying the polyamide with other polymers may be desirable to improve properties such as toughness, modulus, strength, creep, durability, thermal resistance, conductivity, or fire performance. Nylon2, Nylon6, and Nylon66 and their respective copolymers, alloys, and blends are particularly preferred.

The polyamide formulation can also optionally contain one or more additives known in the art of polymer processing, such as polymeric stabilizers, for example, UV light, and thermal stabilizers, lubricants, antioxidants, pigments, dyes, or other additives to alter the materials optical properties or color, conductive fillers or fibers, release agents, slip agents, plasticizers, antibacterial or fungal agents, and processing agents, for example, dispersing reagents, foaming or blowing agents, surfactants, waxes, coupling reagents, rheology modifiers, film forming reagents, and free radical generating reagents. A particularly preferred formulation includes Nylon2, Nylon6, and/or Nylon66, montmorillonite modified with melamine hydrochloride and/or melamine, melamine cyanurate and/or melam (1,3,5-triazine-2,4,6-triamine-n-(4,6-diamino-1,3,5-triaxine-yl)) cyanureate, and/or melem ((-2,5,8-triamino-1,3,4,6,7,9,9b-heptaazaphelanene)) cyanurate and/or melon (poly{8-amino-1,3,4,6,7,9,9b-heptaazaphenalene-2,5-diyl)imino}) cyanurate, magnesium hydroxide, and one or more additives.

The polyamide formulation preferably contains a polyamide based matrix in an amount of from about 50 to about 95% mass fraction (w/w), and IOH in an amount less than about 25% w/w and optionally a flame-retardant and/or additives in an amount less than about 30% w/w, but in some cases, preferably about 10% w/w. It is preferable that the IOH has a particle size of less than about 200 microns, more preferably less than about 50 microns, and most preferably, less than about 20 microns.

The dispersion may be affected using any suitable melt, solution, or powder based mixing process allowing sufficient shear rate, shear stress, and residence time to disperse the IOH at least partially on a nanometer scale. The molding or forming of the polyamide formulation into fire resistant particles or veils can be carried out using any method known to those in the art. The particles or veils can be added to a carbon fiber sheet (e.g., a prepreg sheet). In some examples, particles may be core particles made using core shell technology. In some such examples, a core of the particle may be a fire-retardant agent and a shell or coating may be a toughening agent. In other such examples, the core includes a toughening agent and the outer shell or coating includes a fire-resistant agent. In example core particles, the core may be a liquid agent or a solid agent. In some examples, the core particles or other formulated toughening agents may be mixed into a resin system of an epoxy matrix of the composite structures 100, 101, 103.

The third additive(s) 134 may be operative to increase the fracture toughness of the layer to which the first and second additives 130, 132 have been added. For example, the first and/or second additives 130, 132 may have properties that reduce the fracture toughness of the composite structures 100, 101, 103 and/or the layers 108, 124, 126. To maintain the desired fracture toughness or increase the fracture toughness, the third additive(s) 134 are added to the same layer (e.g., layer 108, layer 124, layer 126). Alternatively or additionally, the third additive(s) 134 may be added to a layer adjacent to the layers 108, 124, 126 to which the first and/or second additives 130, 132 were added. The third additive(s) 134 are sufficient to return the fracture toughness to the original value of the composite or increase the fracture toughness to a value greater than that of the original composite structure. Thus, a mechanical strength of the composite structures may be improved in addition to increasing the fire resistance of the composite structures.

In some examples, the fracture toughness of the composite structure 100, 101, 103 meets certain standards. For example, the composite structure 100, 101, 103 may meet standards determined based on Mode I and/or Mode II interlaminar fracture toughness tests. Example standard tests may include, but are not necessarily limited to, an ASTM D5528 Standard Test Method for Mode I Interlaminar Fracture Toughness of Unidirectional Fiber-Reinforced Polymer Matrix Composites, an ASTM D6671 Standard Test Method for Mixed Mode I-Mode II Interlaminar Fracture Toughness of Unidirectional Fiber Reinforced Polymer Matrix Composites, an ASTM D7905 Standard Test Method for Determination of the Mode II Interlaminar Fracture Toughness of Unidirectional Fiber-Reinforced Polymer Matrix Composites, and an ASTM D6115, Standard Test Method for Mode I Fatigue Delamination Growth Onset of Unidirectional Fiber-Reinforced Polymer Matrix Composites Examples of third additive(s) 134 include, but are not limited to Poly(aryl) ether ketones (PAEKs), such as PEK, PEEK, PEEEK, and PEKK, Poly(phenylene) oxide (PPO), and other charring thermoplastic materials with good heat release properties. In some examples, polyamide blends (particularly polyamides including nylons) may be used as third additives. In some examples, the third additives 134 that flow before decomposition may also act as toughening agents to improve the fire resistance of the material (e.g., the composite structure 100) through charring mechanisms and/or reduced heat release. The example third additive(s) 134 may take the form of veils, nanotubes, nanoparticles, films, films with self-assembling block copolymers with specialized molecular interface for epoxy resin bonding, meshes, toughening particles, and other filamentous material. In some examples, more than one layer may include the additives 130, 132, 134, and different layers of the composite structures 100, 101, 102 may include different additives.

In some examples, the two outer layers 102, 104, 126 may be a fabric type composite and may form the inner and outer surfaces of the composite structures 100, 101, 103 when the multi-layer composite structures 100, 101, 103 are assembled. In some examples, the fabric type composite layers 102, 104, 126 are a carbon fiber laminate composite, a carbon fiber reinforced plastic, or any other composite operative to form the multi-layer composite structures 100, 101, 103. The fabric layers 102, 104, 126 may be a plain weave fabric that has a thickness between 7.5 microinches and 9 microinches. Alternatively, the outer layers 102, 104, 126 may be a single direction fiber fabric-type composite ply, a prepreg ply, or any other type of composite ply. In some examples, the outer layers 102, 104, 126 may include other materials (e.g., wire) interwoven in the fabric and/or mixed into the composite ply for, in some examples, electrical conductivity purposes. In some examples, an outer one of the two example fabric type layers 102, 104, 126 (e.g., the layer 104 forming the outer surface of the composite structures 100, 101, 103) may include interwoven wire. In the illustrated example, the fabric type composite layers 102, 104, 126 are oriented at 0 degrees and 90 degrees relative to a reference plane. That is, in some examples, the interlocking weave of the fibers is oriented such that the fibers in the first direction are at 0 degrees and the fibers woven in a different, perpendicular direction are at 90 degrees. Alternatively, in examples where the outer layers include fibers oriented in a single direction, the fibers may be oriented at, for example, 90 degrees or 0 degrees.

In some examples, the inner layers 106, 120, 128 may be disposed between the fabric type composite layers 102, 104, 126. In a preferred example, the inner layers 106, 120, 128 may be a combination of fabric type composite layers and tape type composite layers. In some examples, the inner layers 106 of the multi-ply composite structure 100 of FIG. 1A are tape-type composite layers (e.g., uni-tape). In such examples, the example tape-type composite layers 106 include carbon fibers oriented in a single direction. In some examples, each of the inner layers 106, 120, 128 may have a thickness between 5 microinches and 8 microinches, depending of the type of composite layer. Thus, the inner layers 106, 120, 128 may be thinner than the fabric type composite layers 102, 104, 126. The inner layers 106, 120, 128 may be oriented in different directions when the multi-ply composite structure 100, 101, 102 is formed. For example, a second layer 108 of the composite structure 100 may be oriented at 45 degrees, a third layer 110 may be oriented at 90 degrees, a fourth layer 112 and a fifth layer 114 may be oriented at −45 degrees, a sixth layer 116 may be oriented at 90 degrees, and a seventh layer 118 may be oriented at 45 degrees.

In another example, such as the example of FIG. 1B, the composite structure 101 may include a different number of inner layers 120 with different orientations. Some layers of the different set of inner layers 120 may be substantially identical to layers of the inner layers 106 and, thus, like reference numbers are used. In the illustrated example composite structure 101 of FIG. 1B, the example second layer 122 is oriented at 45 degrees, the third layer 124 is oriented at −45 degrees, the fourth layer 110 is oriented at 90 degrees, the fifth layer 114 is oriented at −45 degrees, and the sixth layer 118 is oriented at 45 degrees. The illustrated example composite structure 101 of FIG. 1B has one less layer than the composite structure 100 illustrated in FIG. 1A and may be used, in some examples, for a fuselage that is smaller than a fuselage for which the example composite structure 100 of FIG. 1A may be used. That is, other example composite structures may have a different number of layers sufficient for a different size fuselage of an aircraft for which the composite structure 100, 101, 103 is to be used. Alternatively, composite structures with a different number of layers may be used for different applications than the example composite structures 100, 101, 103 of FIGS. 1A-1C. Any number of layers may be used that is sufficient for the application(s) for which the composite structures 100, 101, 103 are to be used.

FIG. 2 is an example exploded view of the example composite structure 100 of FIG. 1A. FIG. 2 more clearly depicts the example orientations of the example layers. In the illustrated example, the first layer 102 is oriented such that the fibers are at 0 degrees and 90 degrees, the second layer 108 of the composite structure 100 may be oriented at 45 degrees, the third layer 110 may be oriented at 90 degrees, the fourth and fifth layers 112, 114 may be oriented at −45 degrees, the sixth layer 116 may be oriented at 90 degrees, the seventh layer 118 may be oriented at 45 degrees, and the eighth layer 104 may be oriented such that the fibers are at 0 degrees and 90 degrees. The example additives 130, 132, 134 may be mixed evenly throughout the second layer 108 of the illustrated example.

Figure 3:
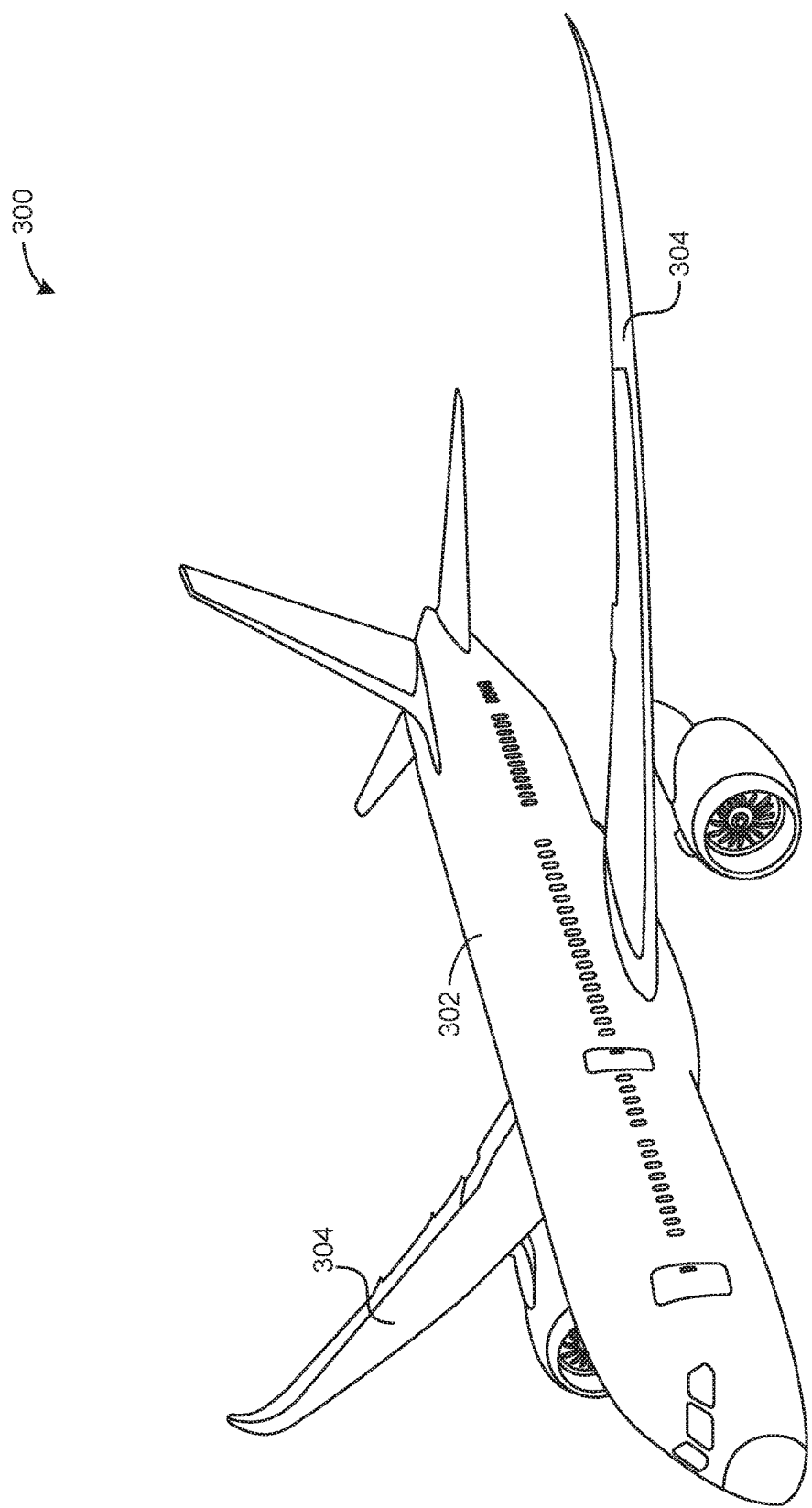
FIG. 3 illustrates an aircraft including a fuselage with which example multi-ply composite structures described herein may be implemented.

FIG. 3 illustrates an example environment within which the example composite structures 100, 101, 103 described herein may be implemented. The example composite structures 100, 101, 103 described herein may be used, for example, with an aircraft 300. Alternatively, the example composite structures 100, 101, 103 may be used in a variety of other applications, including watercraft, spacecraft, automobiles, land vehicles, turbines, sporting equipment, military equipment, medical equipment, and consumer goods.

The example aircraft 300 includes a fuselage 302, which may enclose a passenger cabin and/or a cargo area. In some examples, the fuselage 302 may be a multi-ply composite fuselage, such as a carbon fiber reinforced plastic fuselage. Alternatively, the fuselage 302 may be made of a different type of composite material. The example aircraft 300 includes wings 304 (e.g., a right wing and a left wing) extending laterally outward from the fuselage 302. The example wings 304 may be made of substantially the same composite material as the composite fuselage 302. Alternatively, the wings 304 may be made of a different composite material. The example fuselage 302 and wings 304 may be made of the example composite structures 100, 101, 103 described herein. Additionally, other components of the aircraft (e.g., overhead bins, dividers, structural components, other cabin components, etc.) may also be made of the example composite structures 100, 101, 103.

Figure 4:
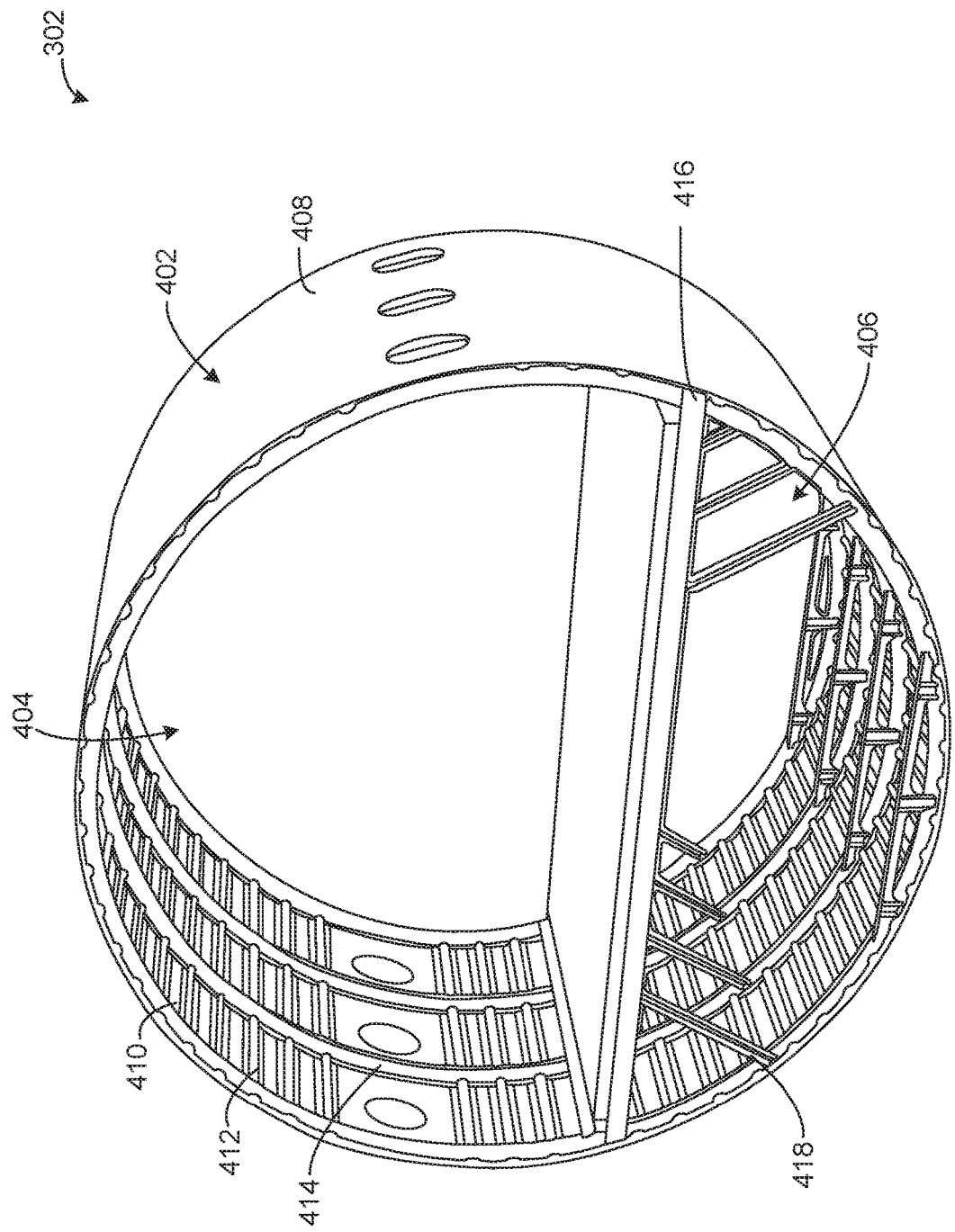
FIG. 4 depicts an example cross-sectional view of the example aircraft with which the example multi-ply composite structures described herein may be implemented.

FIG. 4 depicts an example cross-sectional view of the example aircraft 300 with which the example composite structures 100, 101, 103 may be implemented. In the illustrated example, a barrel 402 of the fuselage 302 encloses a passenger cabin 404 and a cargo area 406 disposed below the cabin 404. The barrel 402 of the fuselage 302 has an outer surface (e.g., an outer skin) 408 and an inner surface (e.g., an inner skin) 410. The barrel 402 of the fuselage 302 includes stringers 412 (e.g., longitudinal supports) and frames 414 (e.g., circumferential supports) integrated into the structure of the fuselage 302. In some examples, the stringers 412 and/or frames 414 are made of the same composite or a similar composite material as the barrel 402. Alternatively, the stringers 412 and/or frames 414 may be made of a metal (e.g., aluminum). The illustrated fuselage 302 also includes a divider 416 to divide the cabin area 404 from the cargo area 406. In some examples, the divider 416 may also be made of the same composite material. Additionally, floor beams 418 of the divider 416 and/or floor beams 410 of the cargo area 406 may be made of a composite material. In some examples, other components that may be included in the structure of the fuselage 302 and/or wings 304 may also be made of a composite material. Alternatively, any other suitable material may be used instead. Further, in other examples, the aircraft 100 may use a sandwich structure rather than including the stringers 412. In such examples, the sandwich structure is made of a composite structure 100, 101, 103 described herein, and the sandwich structure may include multiple composite structures 100, 101, 103 as described herein and, thus, may have multiple layers including the additives 130, 132, 134.

In some implementations of the example composite structures 100, 101, 103 the limiting design factor may be flammability resistance rather than mechanical strength. The example composite structures 100, 101, 103 described herein enable the design of, for example, the fuselage 302 to be less limited by fire resistance requirements. That is, embedding fire-resistant additives (e.g., first additives 130) in the composite structures 100, 101, 103 enables the composite structures 100, 101, 103 to be more resistant to fire than composite structures having a similar number of layers, but without embedded fire-resistant additives 130. Thus, adding the fire-resistant additives 130 allows for the composite structures 100, 101, 103 to be thinner and to satisfy the fire resistance standards of the industry. Thus, the composite structures 100, 101, 103 can be more appropriately sized for mechanical limitations, rather than fire resistance limitations. For example, a composite structure 100, 103 for larger commercial aircraft may have more layers than a composite structure 101 for smaller commercial aircraft, but all composite structures 100, 101, 103 described herein include fire-resistant additive(s) 130 and satisfy the flammability standards. Increasing the flammability resistance of the composite structures 100, 101, 103 can allow for fewer layers (e.g., size for mechanical standards rather than flammability standards). Additionally, the described method of adding flame resistant materials to the composite layers does not affect the manufacturing time of composite fuselages as much as spraying on a fire-resistant coating after assembly of the composite fuselages or adding films as part of the cure process to increase fire-resistance. Thus, manufacturing a composite structure 100, 101, 103 with fire-resistant additives embedded in a structural layer of the composite structure 100, 101, 103 not only reduces manufacturing time of a fuselage of an aircraft, but may also reduce a weight of a fuselage of an aircraft and/or a cost of manufacture of a fuselage of an aircraft.

Figure 5A:
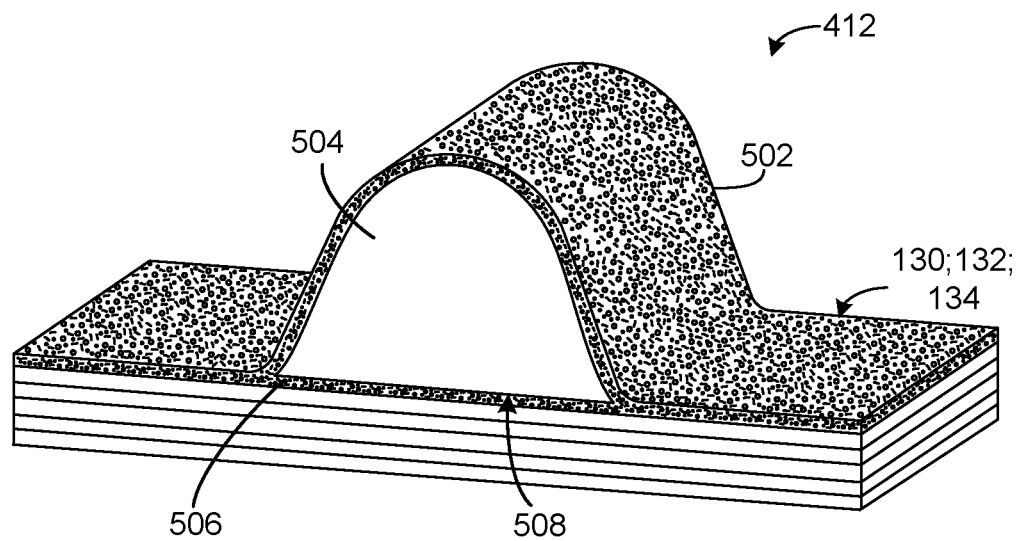
FIGS. 5A and 5B depict example stringers of an aircraft that may include the fire-resistant additives.
Figure 5B:
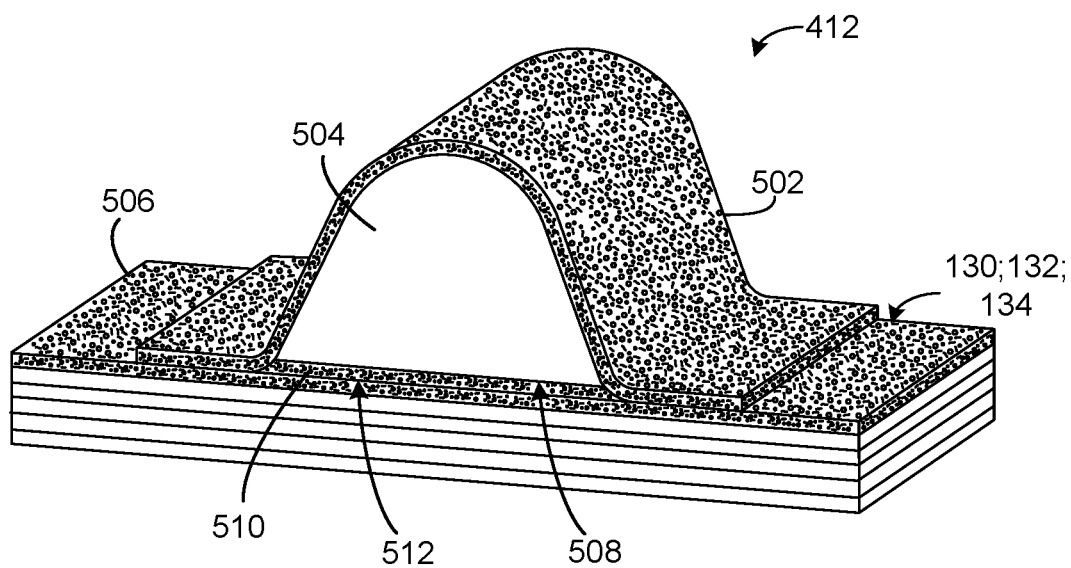

FIGS. 5A and 5B depict the example stringers 412 of the example aircraft 300 that may include the additives (e.g., the first additives 130, the second additives 132, the third additives 134). In the illustrated examples, the stringer 412 has a top layer 502 (e.g., innermost layer) that includes the fire-resistant additives 130, 132, 134. In the illustrated example, an internal portion 504 of the stringer 412 does not include the additives 130, 132, 134. However, a top layer 506 (e.g., innermost layer) of the skin 410 of the aircraft includes the additives 130, 132, 134. Thus, when the stringer 412 is coupled to the skin 410, a bottom surface 508 of the stringer 412 is adjacent to the layer 506 including the additives 130, 132, 134. In some examples, the top layer 502 of the stringer 412 is integrated with the top layer 506 of the skin 410, as shown in FIG. 5A. Alternatively, the top layer 502 of the stringer 412 is separate from the top layer 506 of the skin, as shown in FIG. 5B. In some such examples, the top layer 502 of the stringer 412 may also be the bottom layer 510 of the stringer 412 (e.g., the top layer 502 splits and surrounds the internal portion 504 of the stringer 412) such that a bottom surface 512 of the stringer 412 includes the additives 130, 132, 134. In some examples, the stringer 412 may be a blade type stringer, which may be a composite structure 100, 101, 103 as described herein and may have at least one layer including fire-resistant additives 130, 132, 134.

Figure 6:
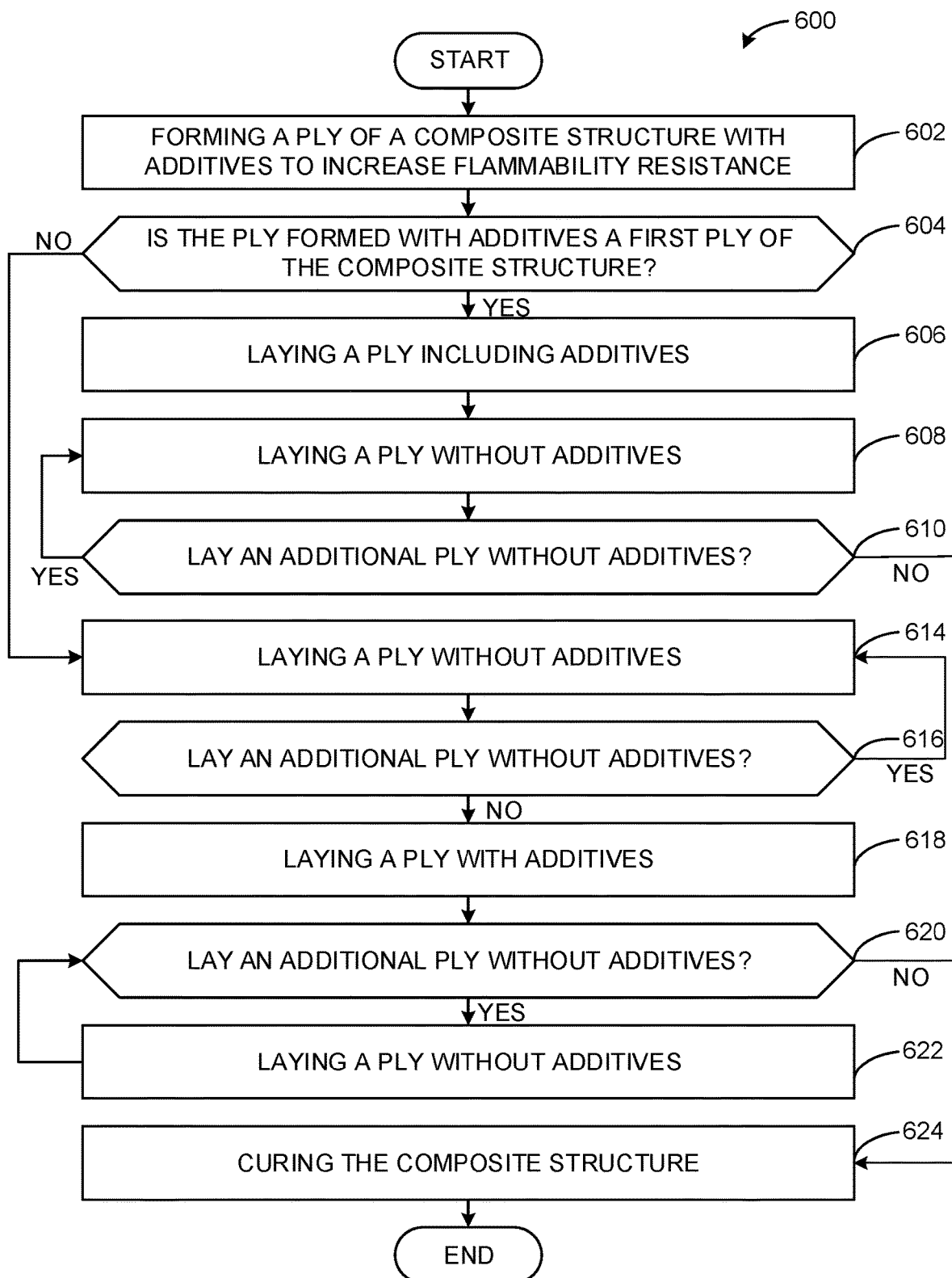
FIG. 6 depicts an example flowchart representative of a method of manufacturing the example multi-ply composite structure of FIGS. 1A-1C.

FIG. 6 depicts an example flowchart representative of a method 600 of manufacturing the example composite structures 100, 101, 103. In some examples, the order of execution of the blocks may be changed, and/or some of the blocks described may be changed, eliminated, or combined. The example method 600 of manufacture begins by forming at least one ply of a composite structure 100, 101, 103 using additives 130, 132, 134 (block 602). For example, the additives 130, 132, 134 may include fire-resistant additives 130, char-inducing additives 132, and/or strengthening additives 134, as described in conjunction with FIGS. 1A-1C. In some examples, additional plies are formed using the additives 130, 132, 134. Additional plies that are to be used to form a composite structure 100, 101, 103 may also be formed without additives 130, 132, 134. It is then determined if the ply including additives 130, 132, 134 is a first ply of the composite structure 103 (block 604). If the ply including additives 130, 132, 134 is the first ply 126, manufacturing continues with laying the first ply 126 including the additives 130, 132, 134 (block 606). The example first ply 126 including additives 130, 132, 134 may be less flammable and/or stronger than an adjacent ply to be laid to form the composite structure 103. Next, a ply without additives 130, 132, 134 (e.g., layer 122) is laid for the composite structure 103 (block 608). It is then determined whether to lay an additional ply without additives, 130, 132, 134 (e.g., a remainder of layers 128) (block 610). If another ply without additives 130, 132, 134 is to be laid on the composite structure 103, the step of block 608 repeats.

If, at block 604, the ply formed with additives 130, 132, 134 is not the first ply (e.g., layer 108, layer 124), the method proceeds to block 612, and a ply without additives (e.g., layer 102) is laid as the first layer of a composite structure 100, 101. It is then determined whether to lay an additional ply without additives (e.g., layer 122) (block 614). If an additional ply without additives is to be laid, block 612 repeats. If no additional plies without additives are to be laid prior to the ply with additives, the method continues to block 616, and a ply including additives (e.g., layer 108, layer 124) is laid for the composite structure 100, 101. It is then determined whether to lay an additional ply without additives (block 618). If an additional ply without additives is to be laid, the additional ply is laid (block 620). If, at blocks 610 and 622, no additional plies are to be laid, all of the layers in the composite structure 100, 101, 103 are laid and the composite structure 100, 101, 103 is cured (block 622). The composite structure 100, 101, 103 may be cured using a co-cure process. The example method 600 of forming a composite structure 100, 101, 103 is complete. In some examples, the composite structure 100, 101, 103 formed by the described method 600 of manufacture may be used to assemble the fuselage 302 and/or wings 304 of the aircraft 300.

Typically, the example composite fuselage 302 of the example aircraft 300 is sized (e.g., a thickness of an aircraft is selected) based on structural requirements. In such examples, each layer of the composite structure (e.g., the composite fuselage) is a structural layer. In some examples, the size of the aircraft 300 is large enough such that the thickness of the composite fuselage 302 is sufficiently thick for structural requirements, and is also sufficiently thick for flammability resistance requirements. However, smaller aircraft 300 may use thinner fuselages 302 that are sufficiently thick for structural requirements, but not for flammability resistance requirements. In such examples, additional flammability protection is added to the fuselage 302 and/or to the structural layers (e.g., layers 108, 124, 126) of the composite structure 100, 101, 103 of the fuselage 302, such as the additives described herein.

Figure 7:
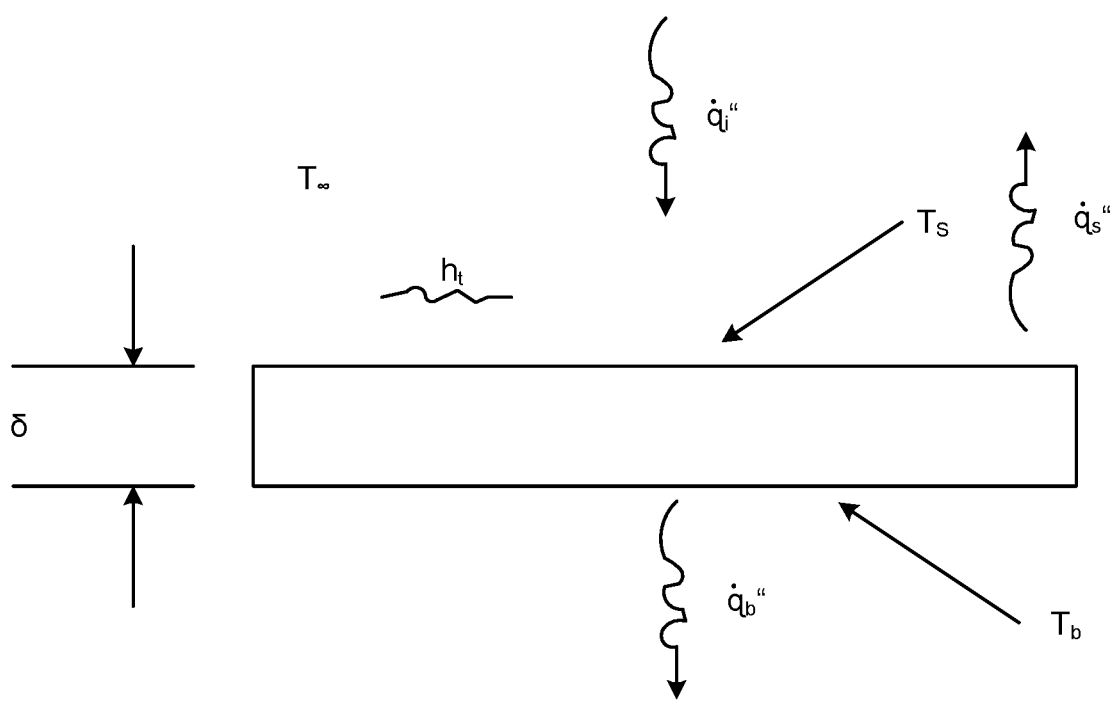
FIG. 7 is a diagram depicting heat flux through an example composite structure.

For a thermally thin structure, thickness plays a crucial role in the time to ignition and the subsequent propagation of a fire across surface of the structure. As the thickness increases, the difference between the surface temperature subject to the impinging flame and the temperature on the backside of the structure increases. For thermally thick structures, the heat loss off the back surface is negligible and heat loss through the structure is governed by conduction. The flux of energy from an ignition source, the thermal capacitance of the material, and the chemical energy released from and/or required for chemical decomposition during deflagration are primary factors that determine whether a flame will propagate and if the material will self-extinguish. Burning occurs once the material reaches a critical decomposition temperature with a sufficient supply of oxidants (e.g., oxygen). The change in temperature in the structure is governed by the balance between the heat flux from the flame ($\dot{q}''_i$), the heat loss on the front surface ($\dot{q}''_s$) and the back surface ($\dot{q}''_b$) by radiation and convection, the thermal capacitance of the structure, and the net energy produced from chemical decomposition. The heat flux through an example composite structure (e.g., composite structures 100, 101, 103) is depicted diagrammatically in FIG. 7.

Thermally thick materials with poor fire resistance may yield surface flame propagation regardless of thickness. With improved fire resistance, structures with sufficient thermal thickness may resist flame propagation from a point source due the thermal capacitance of the material and the reduction in reaction rates associated with a thicker structure. As the thickness of a structure approaches a minimum typical thickness of composite aircraft, the fire resistance of the structure is typically more sensitive to the chemical energy stored within the composite material and the temperature required to access the stored chemical energy.

The first layers exposed to the impinging flame are critical to the performance of the overall material because the level of char will influence the diffusion of oxidant into the material and combustion gases out of the material. The reduction in diffusion processes, along with a reduction in chemical energy produced because of chemical conversion to char, reduce the effective energy released from combustion. For a structure of a specified thickness, the chemical energy release required to sustain flame spread is dependent on the heat loss to the environment, the thermal capacitance of the material, and the rate of diffusion of oxidants into the material and combustion products out of the material.

For the thermally thin treatment of the structure, the behavior is governed by Equation 1, where $$\delta \rho c \frac{\partial T}{\partial t}$$

is a thermal capacitance of the composite material, $\dot{q}''_i$ is a heat flux from a flame, $\dot{q}''_s$ is a heat loss on a front surface, $\dot{q}''_b$ is a heat loss on a back surface, and $\dot{r}''H_c$ is a flux rate for a chemical energy conversion.

$$\delta \rho c \frac{\partial T}{\partial t} = \dot{q}''_i - \dot{q}''_s - \dot{q}''_b + \dot{r}''H_c \qquad \text{Equation 1}$$

The thermal capacitance of the material is represented by the left-hand side of the equation $$\left( \delta \rho c \frac{\partial T}{\partial t} \right)$$

and the fluxes (e.g., $\dot{q}''_i$, $\dot{q}''_s$, $\dot{q}''_b$) on the right side drive the temperature change. The flux rate for chemical energy conversion to heat is governed by $\dot{r}''H_c$, a term which can be measured by microscale combustion calorimetry (e.g., using an ASTM D7309 standard test) and careful preparation of the sample. For the perfect "thermally thin" case, the backside temperature is the same as the side where the impingement takes place. The heat loss from both surface of impingement and backside surface are significant. For a given test configuration, the heat from the source ($\dot{q}''_i$) and the heat loss from the front surface ($\dot{q}''_s$) are relatively unaffected by the thickness of the structure. The thermal capacitance of the material is directly related to the thickness of the structure. As the thickness increases, the thermally thin assumption is no longer valid and the backside temperature is reduced as a result of the temperature gradient in the material. This reduction in backside temperature reduces heat transfer from the backside. Regardless of whether the backside heat transfer is significant, the main driving force is the rate of heat released from chemical energy release.

A critical ratio of the chemical energy release rate to heat loss and heat soaked by the structure by thermal capacitance, specific to the test apparatus, determines whether the flame front will be sustained or will self-extinguish. Above a range or specific value for the critical ratio, failure of the test is expected. Therefore, the ply specified shall have an overall formulation which reduces the overall chemical energy released as heat in the overall composite structure. The effect of the constituents shall result in improvement in performance beyond that predicted by a simple rule of mixtures.

Aerospace composite material structures require elevated performance characteristics to satisfy strict industry requirements. The fiber and matrix materials used in the fabrication of aerospace composites must be the highest quality to meet the performance requirements necessary for maximized aircraft safety, including requirements for tensile strength, flame retardance, and fracture toughness. An advancement of materials results in a more complex processing methodology, which increases processing cost due to longer cycle times and additional equipment requirements. Surface preparation of the fiber reinforcements is commonly conducted to weaken bond strength between the fibers and matrix for maximized tensile strength properties. Fibers are often coated to reduce the bond strength between the fiber and matrix, however this treatment is met with a tradeoff of diminished properties in compression after impact (CAI) performance. For aircraft applications, it is insufficient to focus solely on the improvement of structural properties, where properties such as flammability, UV resistance and fracture toughness become critical. Multifunctional epoxy resin systems can similarly be used to improve on these other properties important to high performance aerospace applications, while maintaining enhanced structural properties.

Currently, epoxy resin systems may incorporate multifunctional epoxy systems with di-functional epoxy systems to achieve a polymeric matrix with both improved tensile strength and CAI. The di-functional epoxy resin may be saturated, unsaturated, cycloaliphatic, aromatic, alicyclic, or heterocyclic. Examples of the di-functional epoxy resins may be those based on diglycidyl ether or Bisphenol F, Bisphenol A, phenol, and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidised olefins, aromatic glycidyl amines, heterocyclic glycidyl imidines and amides, glycidyl ethers, or any combination thereof. The preferable di-functional epoxy resin may be from diglycidyl ether of Bisphenol F, diglycidyl ether of Bisphenol A, diglycidyl dihydroxy naphthalene, or any combination thereof.

Functional constituents may be added to the epoxy system individually or in any combination with each of fire retardant agents, char promoting agents, fire retardant and char promoting agents (e.g., IOH FR), a fire retardant agent in a toughening agent, a char promoting agent in a toughening agent, and a fire retardant agent and a charring agent in a toughening agent. In some examples, the toughening agent may be susceptible to charring.

From the foregoing, it will be appreciated that example methods, apparatus and articles of manufacture have been disclosed that increase fire resistance without reducing and/or increasing fracture toughness of a composite structure. The example methods of manufacturing an example composite structure described herein may reduce the total time of manufacture of, for example, an aircraft by eliminating a step of applying a fire-resistant coating to the composite structure after the composite structure is assembled and manufactured. The example methods of manufacturing may also decrease a weight of an example composite structure.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A multi-ply composite fuselage comprising:
an innermost ply forming an inner skin of the multi-ply composite fuselage;
an outermost ply forming an outer skin of the multi-ply composite fuselage; and
a single fire-resistant ply located between the innermost ply and the outermost ply, the single fire-resistant ply including an epoxy-based resin and a first additive mixed evenly throughout the epoxy-based resin, the first additive to increase a flammability resistance of the multi-ply composite fuselage, wherein the single fire-resistant ply is the only ply of the multi-ply composite fuselage that includes the first additive, and wherein no ply of the multi-ply composite fuselage other than the single fire-resistant ply includes a fire-retardant additive.

2. The multi-ply composite fuselage as defined in claim 1, wherein the single fire-resistant ply is positioned within an innermost 50% of plies of the multi-ply composite fuselage.

3. The multi-ply composite fuselage as defined in claim 1, wherein the single fire-resistant ply is positioned within an innermost 33% of plies of the multi-ply composite fuselage.

4. The multi-ply composite fuselage as defined in claim 1, wherein the single fire-resistant ply is positioned within an outermost 33% of plies of the multi-ply composite fuselage.

5. The multi-ply composite fuselage as defined in claim 1, wherein the innermost ply is oriented at a first angle, and wherein an adjacent ply of the multi-ply composite fuselage positioned in contact with the innermost ply is oriented at a second angle.

6. The multi-ply composite fuselage as defined in claim 1, wherein the innermost ply has a first thickness and the single fire-resistant ply has a second thickness less than the first thickness.

7. The multi-ply composite fuselage as defined in claim 1, further comprising an additional ply located between the innermost ply and the outermost ply, the single fire-resistant ply having a first flammability resistance, the additional ply having a second flammability resistance that is less than the first flammability resistance.

8. The multi-ply composite fuselage as defined in claim 1, wherein the single fire-resistant ply further includes a second additive mixed evenly throughout the epoxy-based resin, the second additive to increase a fracture toughness of the multi-ply composite fuselage.

9. The multi-ply composite fuselage as defined in claim 1, wherein the single fire-resistant ply further includes a second additive mixed evenly throughout the epoxy-based resin, the second additive to char upon contact with a flame to form a protective layer, the second additive being a thermoplastic.

10. The multi-ply composite fuselage as defined in claim 1, wherein the innermost ply is a first fabric composite ply, the outermost ply is a second fabric composite ply, and the single fire-resistant ply is a tape composite ply.

11. The multi-ply composite fuselage as defined in claim 1, wherein the single fire-resistant ply further includes a second additive mixed evenly throughout the epoxy-based resin, and a third additive mixed evenly throughout the epoxy-based resin, the second additive being a charring thermoplastic, the second additive to increase a fracture toughness of the multi-ply composite fuselage, the third additive to promote char in the second additive.

12. The multi-ply composite fuselage as defined in claim 11, wherein the single fire-resistant ply is adjacent the innermost ply.

13. The multi-ply composite fuselage as defined in claim 12, further comprising an additional ply that does not include any of the first, second or third additives, the additional ply being located between the single fire-resistant ply and the outermost ply and further being located adjacent the single fire-resistant ply, the single fire-resistant ply having a first flammability resistance, the additional ply having a second flammability resistance that is less than the first flammability resistance.

14. A multi-ply composite fuselage comprising:
an innermost ply forming an inner skin of the multi-ply composite fuselage;
an outermost ply forming an outer skin of the multi-ply composite fuselage; and
a single fire-resistant ply formed by an epoxy-based resin, a first additive mixed evenly throughout the epoxy-based resin, and a second additive mixed evenly throughout the epoxy-based resin, the first additive to reduce a flammability of the multi-ply composite fuselage, the second additive to increase a fracture toughness of the multi-ply composite fuselage, wherein the single fire-resistant ply is the only ply of the multi-ply composite fuselage that includes the first additive, and wherein no ply of the multi-ply composite fuselage other than the single fire-resistant ply includes a fire-retardant additive.

15. The multi-ply composite fuselage as defined in claim 14, wherein the first additive is an organic fire retardant, an inorganic fire retardant, or an inorganic-organic hybrid fire retardant.

16. The multi-ply composite fuselage as defined in claim 14, wherein the second additive is a charring thermoplastic.

17. The multi-ply composite fuselage as defined in claim 14, wherein the single fire-resistant ply is further formed by a third additive mixed evenly throughout the epoxy-based resin, the third additive to promote char in the second additive.

18. The multi-ply composite fuselage as defined in claim 17, wherein at least two of the first additive, the second additive, and the third additive are combined into an agent.

19. The multi-ply composite fuselage as defined in claim 14, wherein the second additive is at least one of a nanotube, a nanoparticle, a film, a veil, a mesh, toughening particles, or a filamentous material.

20. The multi-ply composite fuselage as defined in claim 14, wherein the single fire-resistant ply of the multi-ply composite fuselage is positioned closer to the innermost ply of the multi-ply composite fuselage than the outermost ply of the multi-ply composite fuselage.

\* \* \* \* \*